United States Patent [19]

Knauss

[11] Patent Number: 4,954,463

[45] Date of Patent: * Sep. 4, 1990

[54] MAGNESIUM ALUMINATE SPINEL REFRACTORY

[75] Inventor: Richard J. Knauss, Swissvale, Pa.

[73] Assignee: Dresser Industries, Inc., Dallas, Tex.

[*] Notice: The portion of the term of this patent subsequent to May 23, 2006 has been disclaimed.

[21] Appl. No.: 283,230

[22] Filed: Dec. 12, 1988

[51] Int. Cl.$^5$ .............................................. C04B 35/04
[52] U.S. Cl. ...................................... 501/120; 501/109
[58] Field of Search ................................. 501/120, 109

[56] References Cited

U.S. PATENT DOCUMENTS

| | | |
|---|---|---|
| 553,758 | 3/1895 | McCreight et al. |
| 1,075,659 | 10/1913 | Mankau .................. 501/120 |
| 1,394,442 | 10/1921 | Purdy et al. ............ 501/120 |
| 2,019,208 | 12/1933 | Baumann et al. ...... 501/120 |
| 2,062,962 | 12/1936 | Baumann et al. ...... 501/120 |
| 2,063,154 | 12/1936 | Easter et al. .......... 501/120 |
| 2,805,167 | 9/1957 | McCreight et al. ... 501/120 |
| 3,316,108 | 4/1967 | Blomberg et al. ..... 501/120 |
| 3,333,971 | 8/1967 | McKenna et al. ..... 501/120 |
| 3,577,247 | 5/1971 | McKenna et al. ..... 501/120 |
| 4,126,479 | 11/1978 | Videtto ................... 501/120 |
| 4,703,022 | 10/1987 | Johnson ................. 501/95 |
| 4,729,974 | 3/1988 | Nazirizadeh et al. . 501/120 |
| 4,833,109 | 5/1989 | Macey et al. .......... 501/120 |

*Primary Examiner*—Mark L. Bell
*Assistant Examiner*—Deborah Jones
*Attorney, Agent, or Firm*—Sigalos, Levine & Montgomery

[57] ABSTRACT

A refractory mix for forming an in situ magnesium aluminate spinel brick consisting essentially of about 65 to 95 wt. % magnesite having an MgO content of at least about 92 wt. % and, correspondingly, about 35 to 1 wt. % calcined bauxite having an alumina content of at least about 83 wt. % and a silica content of no more than about 7 wt. %, the total silica content of the mix being no more than about 4 wt. % and a magnesium aluminate spinel refractory shape prepared by pressing and firing the above refractory mixture. The invention also comprises the process of forming the refractory.

13 Claims, No Drawings

MAGNESIUM ALUMINATE SPINEL REFRACTORY

BACKGROUND OF THE INVENTION

The present invention relates to magnesium aluminate spinel refractory shapes and particularly bricks particularly suited for use in linings of rotary cement kilns which are low cost without sacrificing the necessary properties of low thermal conductivity, low thermal expansion, resistance to corrosion, high spall resistance, and high hot strength.

For a number of years magnesite-chrome refractory shapes, such as brick, provided excellent service and were extensively used as linings in metal working vessels and kilns such as rotary cement kilns. Because of the formation of hexavalent chrome which is classified as a hazardous substance by the federal government and which consequently posed a number of problems; including disposal of used magnesite-chrome brick, the use of such brick has fallen into disfavor.

Efforts to utilize other types of brick, particularly for the harsh environment of the rotary cement kiln operation, have not been entirely successful. However, one type of brick which is being more widely used is magnesite-spinel brick. However, the drawback of magnesite-spinel brick is that they are more expensive than the magnesite-chrome brick traditionally used. Even with the knowledge of the potential dangers of hexavalent chrome formation in magnesite-chrome systems, the magnesite-chrome brick still dominates all other types of brick used in the rotary cement kiln industry. The higher cost of magnesite-spinel brick stemmed mainly from the raw materials used to make the brick as well as some processing costs. Alumina is more expensive than chrome ore and is being used to make in situ spinel brick or the alumina is blended with magnesia then pre-sintered or fused to form spinel grains which were then utilized in making the brick. Such pre-sintering or fusing of the grain is an extra and expensive processing step which again raises the cost of the magnesite-spinel brick.

Efforts to substantially lower the cost of magnesite-spinel brick while maintaining performance level have not been heretofore successful.

SUMMARY OF THE INVENTION

An inexpensive chrome-free brick for high temperature uses in rotary kilns and other environments has been developed.

Briefly, the present invention comprising a refractory mixture for forming an in situ magnesium aluminate spinel brick consisting essentially of about 65 to 99 wt.% magnesite having an MgO content of at least about 92 wt.% and, correspondingly, about 35 to 1 wt.% calcined bauxite having an alumina content of at least about 83 wt.% and a silica content of no more than about 7 wt.%; the total silica content of the mix being no more than about 4 wt.%.

The invention also comprises the resultant refractory shape and particularly bricks and the process of forming the bricks as hereinafter described.

DETAILED DESCRIPTION

While the instant invention is applicable to a variety of different refractory shapes for various types of high temperature use, it will be described in connection with refractory brick and particularly brick for use in linings for rotary cement kilns.

The essential materials in the instant invention are the magnesite and the bauxite. As to the magnesite, it must have an MgO content of at least about 92 wt.%; although, it is preferred to use magnesite of higher MgO content; i.e., 95 wt.% or higher to ensure a low silica content of the mixture as hereinafter described.

With respect to the bauxite, it must have an alumina content of at least about 83 wt.% and a silica content of no more than about 7 wt.%. Preferably, the bauxite used should have an alumina content of at least about 90 wt.% and a silica content no higher than about 5 wt.%. It is also essential that bauxite be calcined prior to forming the mix. Use of the calcined bauxite having the alumina and silica contents noted eliminates the need to use either high cost alumina or high cost pre-sintered or fused spinel grains. The high amount of alumina allows for the significant spinel formation in situ when the brick is being fired while at the same time it has been found that the lower silica and other impurity levels yield a refractoriness advantage over the use of other bauxites.

In forming the mix, all that need be done is for the magnesite and the calcined bauxite to be thoroughly admixed. It is important, however, to regulate the relative proportions to ensure that the total silica content of the mixture is no more than about 4 wt.%.

As to proportions, for each 100 wt.% of the mixture there should be about 65 to 99 wt.% and, preferably, about 75 to 90 wt.% of magnesite and, correspondingly, 35 to 1 wt.% and, preferably, 25 to 10 wt.% of the calcined bauxite.

As to the grain sizes, the sizes should be those conventionally used for brick making.

In forming the brick, the mixture is shaped in the usual apparatus used for that purpose; namely, a conventional brick press using conventional brick forming pressures and fired. Ordinarily, such brick are fired at temperatures ranging from about 2700° to 3200° F.

It is conventional and best to use binders for the brick in order to maintain its strength in the green state prior to firing, such as lignosulfonates or other conventional binders. By the same token it is preferred to use conventional mold release agents, such as motor oil and the like, to ensure no sticking in the molds. These are added in their conventional amounts: ordinarily in the case of the binder, about 2½ to 4½ wt.% for each 100 wt.% of the mix; and, in the case of the release agent, such as the motor oil, anywhere from about 0.40 to 0.75 wt.% for each 100 parts by weight of the mix.

When the refractory shape in the green state is fired, the firing temperatures will cause the alumina to react with the magnesia to form the spinel, thus resulting in the final magnesium aluminate spinel brick.

The invention will be further described in connection with the following examples which are set forth for purposes of illustration only.

EXAMPLES 1 TO 7

A series of 7 different brick were made from mixes whose composition is set forth in Table I below. All of the mixes were pressed at 12,000 psi and burned at 2800° F. Mixes 1, 2, 3, and 4 were also burned at 3100° F. The brick were then tested as to strength and thermal conductivity.

TABLE I

| EXAMPLE NO. | 1 | 2 | 3 | 4 | 5 | 6 | 7 |
|---|---|---|---|---|---|---|---|
| Magnesia Content/Spinel Content: | 80/22 | 80/23 | 68/37 | 65/39 | 65/39 | 78/21 | 79/20 |
| Mix: | | | | | | | |
| Magnesite A | 26% | 26% | 26% | 23% | 23% | — | — |
| −4 + 10 mesh | 24 | 24 | 24 | 24 | 24 | — | — |
| −10 + 28 mesh | 9 | 3 | — | 3 | 3 | — | — |
| BMF 70 | 23 | 17 | 15 | 17 | 17 | — | — |
| Magnesite B | | | | | | | |
| −4 + 10 mesh | — | — | — | — | — | 28% | 28% |
| −10 + 35 mesh | — | — | — | — | — | 27 | 27 |
| BMF 70 | — | — | — | — | — | 27 | 27 |
| Calcined Bauxite | | | | | | | |
| −10 + 28 mesh | 5 | 5 | 5 | 5 | 5 | — | — |
| −10 + 38 mesh | — | — | — | — | — | 5 | 5 |
| −28 + 65 mesh | 3 | 5 | 5 | 5 | 5 | — | — |
| −38 + 65 mesh | — | — | — | — | — | 1.5 | 1.5 |
| −65 mesh | — | — | — | — | — | 1.5 | 1.5 |
| BMF 60 | 10 | 20 | 20 | 20 | 20 | 10 | 10 |
| Zirconia | — | — | 5 | — | — | — | — |
| Alumnina-Silica Grain (Lightweight 47 - Mulcoa) | | | | | | | |
| −3 mesh | — | — | — | 3 | — | — | — |
| −14 mesh | — | — | — | — | 3 | — | — |
| Plus Additions: | | | | | | | |
| Sodium Lignosulfonate (Silicanit) | | | | 3.80 | | | |
| Used Motor Oil | | | | 0.50 | | | |
| Calcium Carbonate (Limestone) | — | — | — | — | — | 0.02 | — |
| Density at the Press, pcf: | 183 | 183 | 182 | 187 | 179 | 183 | 183 |
| Burn, °F.: | | | 3100–2800° F. - 6 Hour Hold | | | | |
| Linear Change on Burning, %: | −0.7 | +0.7 | +1.7 | +1.9 | +1.9 | −0.8 | −0.3 |
| Bulk Desnity, pcf (Av 5): | 184 | 174 | 170 | 174 | 166 | 182 | 182 |
| Data From Porosity (Av 3) | | | | | | | |
| Bulk Density, pcf: | 184 | 174 | 168 | 171 | 164 | 182 | 182 |
| Apparent Porosity, %: | 16.6 | 20.5 | 23.3 | 23.4 | 24.6 | 18.2 | 18.6 |
| Apparent Specific Gravity: | 3.52 | 3.52 | 3.50 | 3.57 | 3.49 | 3.51 | 3.52 |
| Modulus of Rupture (Av 3) | | | | | | | |
| At Room Temperature, psi: | 890 | 750 | 880 | 880 | 900 | 1130 | 920 |
| At 2300° F., psi: | 720 | 360 | 340 | 330 | 290 | 1240 | 870 |
| At 2700° F., psi: | 160 | — | — | — | — | 5 | 10 |
| Modulus of Elasticity | | | | | | | |
| psi × $10^6$ (Av 3): | — | — | — | — | — | 3.04 | 2.50 |
| Reheat Change (2910° F.) | | | | | | | |
| Linear Change, %: | — | −0.33 | −0.76 | −1.09 | −0.87 | — | — |
| Volume Change, %: | — | −1.35 | −2.99 | −5.93 | −3.31 | — | — |
| **Chemical Analysis* (Calcined Basis)** | | | | | | | |
| Silica ($SiO_2$) | 2.09% | 1.97% | 2.78% | 2.81% | 4.23% | 2.80% | 2.71% |
| Alumina ($Al_2O_3$) | 15.9 | 16.4 | 26.4 | 26.9 | 28.1 | 15.4 | 14.7 |
| Titania ($TiO_2$) | 0.68 | 0.63 | 1.05 | 1.04 | 1.09 | 0.68 | 0.66 |
| Iron Oxide ($Fe_2O_3$) | 0.50 | 0.54 | 0.70 | 0.67 | 0.72 | 0.40 | 0.41 |
| Chromic Oxide ($Cr_2O_3$) | 0.04 | 0.05 | 0.04 | 0.03 | 0.04 | 0.01 | 0.01 |
| Lime (CaO) | 0.71 | 0.70 | 0.62 | 0.58 | 0.61 | 2.99 | 1.79 |
| Boron Oxide ($B_2O_3$) | 0.046 | 0.08 | 0.06 | 0.05 | 0.04 | 0.037 | 0.022 |
| Zirconia ($ZrO_2$) | — | — | — | 4.40 | — | — | — |
| Total Analyzed | 19.97% | 20.37% | 31.65% | 36.48% | 34.83% | 22.32% | 20.30% |
| By Difference | | | | | | | |
| Magnesia (MgO) | 80.03 | 79.63 | 68.35 | 63.52 | 65.17 | 77.68 | 79.70 |
| Total | 100.00% | 100.00% | 100.00% | 100.00% | 100.00% | 100.00% | 100.00% |

*By x-ray spectrograph except boron oxide by emission spectrograph.
The calcined bauxite, by chemical analysis on a calcined basis contained 88.6 wt. % alumina and 5.10 wt. % silica, with the balance being primarily titania and iron oxide.

On burning at 2800° F. only Mixes 6 and 7 showed signs of sticking and squeezing. Also, Mix 1 was the only mix that could be burned at the 3100° F. temperature. All the other mixes stuck severely. The sticking in Mixes 2, 3, and 4 appears to have been related to their higher bauxite content which increased the amount of silica in the brick.

EXAMPLES 8 THROUGH 11

The mix of Example 1 was compared with magnesite-spinel bricks prepared from various grades of magnesite and utilizing fused spinel. The mixtures for these are set forth in Table II below. Brick were formed from these mixes as in Example 1 and again as tested and Example 2 shows the results.

TABLE II

| EXAMPLE NO. | 8 | 9 | 10 | 11 |
|---|---|---|---|---|
| Magnesite Used: | A | A | B | C |
| Spinel Addition: | Bauxite | Fused Spinel | Fused Spinel | Fused Spinel |
| Density at the Press, pcf: | 183 | 189 | 193 | 178 |
| Burn, °F.: | 3100 | 3100 | 2800 | 3050 |
| Linear Change in Burning, %: | −0.7 | −0.7 | −0.4 | −0.2 |
| Bulk Density, pcf: | 184 | 189 | 190 | 180 |
| Data From Porosity | | | | |
| Bulk Density, pcf: | 184 | 186 | 187 | 178 |
| Apparent Porosity, %: | 16.6 | 15.3 | 15.4 | 20.1 |
| Apparent Specific Gravity: | 3.52 | 3.42 | 3.54 | 3.56 |
| Modulus of Rupture | | | | |
| At Room Temperature, psi: | 890 | — | — | — |
| At 2300° F., psi: | 720 | 740 | 1060 | 1140 |
| At 2700° F., psi: | 160 | 70–160 | 25–80 | 130–240 |
| Modulus of Elasticity | | | | |
| psi $\times 10^6$: | — | 3.24 | 2.62 | 2.96 |
| Chemical Analysis* (Calcined Basis) | | | | |
| Silica ($SiO_2$) | 2.09% | 0.99% | 0.86% | 1.49% |
| Alumina ($Al_2O_3$) | 15.9 | 12.50 | 16.20 | 13.80 |
| Titania ($TiO_2$) | 0.68 | 0.60 | 0.75 | 0.62 |
| Iron Oxide ($Fe_2O_3$) | 0.50 | 0.48 | 0.55 | 2.52 |
| Chromic Oxide ($Cr_2O_3$) | 0.04 | 0.06 | 0.06 | 1.20 |
| Lime (CaO) | 0.71 | 0.85 | 1.77 | 0.55 |
| Boron Oxide ($B_2O_3$) | 0.046 | 0.07 | 0.021 | — |
| Total Analyzed | 19.97% | 15.55% | 20.20% | 20.18% |
| By Difference | | | | |
| Magnesia (MgO) | 80.03 | 84.45 | 79.80 | 79.82 |
| Total | 100.00% | 100.00% | 100.00% | 100.00% |

*By x-ray spectrograph except boron oxide by emission spectrograph.
Magnesite A contained 98 wt. % magnesia, Magnesite B had 96 wt. % magnesia, and Magnesite C had 95 wt. % magnesia.

It will be seen that the brick made utilizing the calcined bauxite of the instant invention and fired to form the spinel in situ had essentially the same strength as the brick using the more expensive fused spinel.

While the invention has been described in connection with a preferred embodiment, it is not intended to limit the scope of the invention to the particular form set forth, but, on the contrary, it is intended to cover such alternatives, modifications, and equivalents as may be included within the spirit and scope of the invention as defined by the appended claims.

What is claimed is:

1. A refractory mix for forming an in situ magnesium aluminate spinel refractory shape consisting essentially of about 65 to 99 wt.% magnesite having an MgO content of at least about 92 wt.% and, correspondingly, about 35 to 1 wt.% calcined bauxite having an alumina content of at least about 83 wt.% and a silica content of no more than about 7 wt.%; the total silica content of the mix being no more than about 4 wt.%.

2. The refractory mix of claim 1 wherein said magnesite has an MgO content of at least about 95 wt.% and said calcined bauxite has an alumina content of at least about 90 wt.% and a silica content no higher than about 5 wt.%.

3. The refractory mix of claim 1 or 2 wherein said mix contains about 75 to 90 wt.% of said magnesite and, correspondingly, 25 to 10 wt.% of said calcined bauxite.

4. The refractory mix of claim 1 or 2 also including a binder and a mold release agent.

5. A magnesium aluminate spinel refractory shape consisting essentially of a pressed and fired mix consisting essentially of about 65 to 99 wt.% magnesite having an MgO content of at least about 92 wt.% and, correspondingly, about 35 to 1 wt.% calcined bauxite having an alumina content of at least about 83 wt.% and a silica content of no more than about 7 wt.%; the total silica content of the mix being no more than about 4 wt.%.

6. The refractory shape of claim 5 wherein said magnesite has an MgO content of at least about 95 wt.% and said calcined bauxite has an alumina content of at least about 90 wt.% and a silica content no higher than about 5 wt.%.

7. The refractory shape of claim 5 or 6 wherein said shape is a brick.

8. The refractory shape of claim 5 or 6 wherein said mix contains about 75 to 90 wt.% of said magnesite and, correspondingly, 25 to 10 wt.% of said calcined bauxite.

9. The refractory shape of claim 5 or 6 wherein said shape is a brick and said mix contains about 75 to 90 wt.% of said magnesite and, correspondingly, 25 to 10 wt.% of said calcined bauxite.

10. The process of making a magnesium aluminate spinel refractory shape comprising forming a mix consisting essentially of about 65 to 99 wt.% magnesite having an MgO content of at least about 92 wt.% and, correspondingly, about 35 to 1 wt.% calcined bauxite having an alumina content of at least about 83 wt.% and a silica content of no more than about 7 wt.% with the total silica content of the mix being no more than about 4 wt.%; pressing the mix into the shape desired; and firing the shaped mix at a temperature of about 2700° to 3200° F. to cause the alumina to react with the magnesia to form a magnesium aluminate spinel and form the shape.

11. The process of claim 10 wherein said magnesite has an MgO content of at least about 95 wt.% and said calcined bauxite has an alumina content of at least about 90 wt.% and a silica content no higher than about 5 wt.%.

12. The process of claim 10 or 11 wherein said mix contains about 75 to 90 wt.% of said magnesite and, correspondingly, 25 to 10 wt.% of said calcined bauxite.

13. The process of making a magnesium aluminate spinel brick comprising forming a mix consisting essentially of about 65 to 99 wt.% magnesite having an MgO content of at least about 92 wt.% and, correspondingly, about 35 to 1 wt.% calcined bauxite having an alumina content of at least about 83 wt.% and a silica content of no more than about 7 wt.% with the total silica content of the mix being no more than about 4 wt.%; pressing the mix into the shape desired; and firing the shaped mix at a temperature of about 2700° to 3200° F. to cause the alumina to react with the magnesia to form a magnesium aluminate spinel and form the brick.

* * * * *